US006254479B1

(12) United States Patent
Okitani et al.

(10) Patent No.: US 6,254,479 B1
(45) Date of Patent: Jul. 3, 2001

(54) GAME MACHINE

(75) Inventors: Genichiro Okitani, Yamato; Ryosuke Toriyama, Yokohama; Takaaki Ishii, Yamato; Yukari Shibata, Hiratsuka; Yukio Ozaki, Yokohama, all of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/233,645

(22) Filed: Jan. 19, 1999

(30) Foreign Application Priority Data

Jan. 20, 1998 (JP) ........................ 10-008492

(51) Int. Cl.[7] ........................ A63F 13/00

(52) U.S. Cl. ........................ 463/7; 463/16; 273/138.2; 273/440; 273/454

(58) Field of Search ........................ 273/143 R, 138.2, 273/138.1, 454, 460, 440; 463/3, 16, 7, 23

(56) References Cited

U.S. PATENT DOCUMENTS 4,060,240 11/1977 Dunston .
4,321,673 3/1982 Hawwass et al. .
5,024,439 * 6/1991 Okada ........................ 273/143 R
5,722,891 * 3/1998 Inoue ........................ 463/20

FOREIGN PATENT DOCUMENTS 0159456 10/1985 (EP) .

OTHER PUBLICATIONS

'Double or Nothing", Bally advertisement,.*

* cited by examiner

*Primary Examiner*—Benjamin H. Layno
(74) *Attorney, Agent, or Firm*—Jordan and Hamburg LLP

(57) ABSTRACT

In a game machine which comprises a roulette part for rotating an indicating mark along an outside of a play field, the indicating mark is stopped in accordance with a signal from a stop switch. If the indicating mark is stopped in a center position of a prize area which is indicated with a chance gage, a payment of medals as a reward is allowed. If the indicating mark is stopped in a position which is included in the prize area but don't coincide with the center position, a process of a lottery with a random number is carried out and a gage volume of a level gage is changed in the basis of the random number. An additional chance of a payment of medals is given corresponding to a position in which the indicating mark is stopped.

23 Claims, 8 Drawing Sheets

A : A PRIZE AREA WHEN ONE MEDAL IS BET

B : A PRIZE AREA WHEN TWO MEDAL IS BET

C : A PRIZE AREA WHEN THREE MEDAL IS BET

GAME MACHINE

BACKGROUND OF THE INVENTION

1. Field of the Invention

The present invention relates to a game machine in which a movement of an indicating mark is stopped by an operation of a game player and a lottery result is determined on the basis of a position in which the indicating mark is stopped.

2. Description of the Related Art

Traditionally, in a field of a so-called arcade game machine which is set in an arcade environment or the like, there is such a machine which gives a game player chances for a predetermined number of times of lotteries when the player throws medals. In the respective chances of the lotteries, an indicating mark for lotteries is moved along a predetermined route. And with an operation of the player for stopping the mark, the mark is stopped on the position according to the timing of the operation. And if the indicating mark is stopped in a predetermined prize area, the machine pays a reward such as medals, a gift or the like.

The above game machine has an advantage that the rule of the game is simple, so the game is easy to be familiar to the majority of players. On the other hand, the player is apt to lose his interest in the game because of a simplicity of the game and it is difficult to attract the player for a long time.

SUMMARY OF THE INVENTION

One of the object of the prevent invention is to provide a game machine which is able to attract a player for a long time by extinguishing monotony of the game without an extreme complexity thereof.

According to one aspect of the present invention, there is provided a game machine which comprises: a lottery practicing device for carrying out a process of a lottery in which an indicating mark being moved along a predetermined route is stopped in accordance with a direction of a player; a prize area arranging device for arranging a prize area along the route, a size of the prize area being changed in accordance with value which is bet by the player per one chance of the lottery; and a lottery result deciding device for issuing a lottery result when the indicating mark is stopped in the prize area, the lottery result being changed in accordance with a position in which the mark is stopped.

In the above game machine, a game is simple in which a player only directs a stopping of an indicating mark, but the prize area is expanded or reduced according to a value which is bet for one chance of a lottery and a probability of a prize is changed on the basis of a size of the prize area. And even if the indicating mark can be stopped in the prize area, a result of the lottery is not uniform and the result is differ according to a position at which the indicating mark is stopped. So, it is possible to attract the player for a long time by extinguishing a monotony of the game as compared with an usual game machine in which a prize area is fixed and the probability of the prize is uniform.

The prize area arranging device may expand the prize area with increasing the bet value.

In this case, as the bet value per a lottery is higher, a probability of the prize is higher and a loss on the basis of a failure is larger. On the other hand, as a bet value is lower, the probability of the prize is lower and the loss for the failure is smaller. A balance of the profit and the loss is put into player's hands, so the player can enjoy the game.

According to another aspect of the present invention, there is provided a game machine which comprises: a first lottery practicing device for carrying out a first lottery process in which an indicating mark being moved along a predetermined route is stopped in accordance with a direction of a player; a first payment controlling device for allowing a payment of a reward to the player when the indicating mark is stopped in a first prize area set in a part of the route; a second lottery practicing device for carrying out a second lottery process when the indicating mark is stopped in a second prize area in the route by the first lottery process; and a second payment controlling device for giving an additional chance for the payment of the reward when a predetermined result is obtained by the second lottery process.

In this case, the payment of the reward is allowed if the indicating mark can be stopped in the first prize area. And the second lottery process is carried out if the indicating mark is stopped in the second prize area. Then the additional chance of the reward is given if the predetermined result is gotten by the second lottery process. By the additional chance, for instance, the reward may be paid unconditionally, or the reward may be paid when a combination of results of previous or future lotteries and the result of the second lottery process. Since the additional chance is prepared, a monotony is banished from the game as compared with the usual game machine in which a judgement whether a reward is paid or not is performed only on the basis of the fact that the indicating mark is stopped in a predetermined area or out of the area, and specially, a hope of the player for a payment of the reward can be raised. The first prize area and the second prize area may coincide or the first prize area and the second prize areas may have a overlapping area.

The second payment controlling device may allow the payment of the reward to the player when a result of the second lottery process satisfies a predetermined payment condition. In this case, there is some possibility that the player gets the reward even if the reward is paid or not paid by the first lottery process, so a hope of the player can be raised.

When a result of the second lottery process satisfies a predetermined entitling condition, the second payment controlling device may entitle a privilege by which the player can get the reward with a combination of the result of the present second lottery process and a future result of the first or the second lottery process. In this case, when the privilege of getting the reward is given, a possibility of paying the reward by future lottery process is higher. As a result, a hope of the player can be continuously raised through more than one chances of lotteries.

The first payment controlling device may allow the payment of the reward based on the privilege in addition to the payment of the reward corresponding to the first lottery process, if the privilege of getting the reward based on a previous second lottery process remains when the indicating mark is stopped in the first prize area positioned in the part of the route. In this case, when the privilege to get the reward is given by the second lottery process, there is some possibility that a larger reward is paid by the future first lottery process. As a result, a hope of the player is continuously raised through more than one chances of lotteries.

When the privilege of getting the reward is entitled by the second lottery process, the second payment controlling device may allow the payment of the reward if a combination of the privilege and a privilege of getting the reward corresponding to a previous second lottery process satisfies a predetermined payment condition. In this case, when the privilege to get the reward is given by the second lottery process, there is some possibility that a larger reward is paid by the future second lottery process. As a result, a hope of the player is continuously raised through more than one chances of lotteries.

The machine may further comprise a privilege extinguishing device for extinguishing the privilege of getting the reward which is given by a previous second lottery process if the result of the second lottery process satisfies a predetermined extinguishing condition. In this case, even if the second lottery process is carried out, there is possibility that the privilege already given is extinguished in accordance with the result of the second lottery process, so the game comes to be more thrilling.

The second prize area may include an area part outside of the first prize area. In this case, even if the indicating mark is not stopped in the first prize area and the payment of the reward is not allowed, the second lottery process can be carried out on condition that the indicating mark is stopped in the second prize area. And if the predetermined result is gotten by the second lottery process, the additional chance of the payment of a reward is given.

The second prize area may include an area part adjacent to the first prize area in a direction of a movement of the indicating mark. In this case, even if the indicating mark can not be stopped in the first prize area, there is some possibility that the additional chance of the payment of the reward. Because if the indicating mark is stopped in the adjacent area of the first prize area, the second lottery process is carried out later. That is to say, there is some possibility that the player gets a reward through the second lottery process even if the operation timing for stopping is slightly wrong. So, the player can enjoy playing the game even if he doesn't get skillful in the game. And, for instance, by an operation to reduce the first prize area, the game machine may be tuned such that a probability that the indicating mark is stopped in the first prize area is smaller, on the other hand, a very large reward is paid as a bonus if the indicating mark is stopped in the first prize area. In this case, various enjoyments in accordance with a various skill level of the player about the game can be offered, and then, the game machine can be matched to more various classes of players.

The machine may further comprise a prize area arranging device for expanding or reducing either the first prize area or the second prize area along the route in accordance with an amount of the value which is bet by the player per said one chance of the lottery. In this case, a difficulty of stopping the indicating mark in the first prize area or in the second prize area is changeable and the player is able to select a level of the difficulty more freely.

The prize area arranging device may expand or reduce the second prize area. In this case, as a larger value is thrown per a chance of a lottery, a possibility that the second lottery process is carried out comes to be larger. However, because a loss come to be larger when the second lottery process ends in failure, the player is able to enjoy tactics about a decision of the prize areas.

The prize area arranging device may arrange at least the first prize area in the route when a predetermined minimum value per said one chance of the lottery is bet by the player, and arrange a second prize area in such a manner that a size thereof corresponds to a surplus of the bet value over the minimum value when the bet value is greater than the minimum value. In this case, the prize area arranging device arranges the first prize area at least in the route if the predetermined minimum value per the chance of the lottery is bet by the player, and the prize area arranging device arranges the second prize area, a size of which is corresponding to the surplus of the value if the value which is larger than the minimum value is bet. Therefore the chance of the payment by the first lottery process is given at least if the player bets the minimum value. And the second prize area is enlarged and a possibility of the payment of the reward is larger according to the surplus.

The second lottery practicing device may comprises a random number generating device for generating a random number, and the second payment controlling device judges whether or not the additional chance should be given on the basis of the random number generated by the random number generating device. In this case, the second lottery process is automatically carried out in accordance with the random number. Then the player has only to direct that the indicating mark is stopped, and a complicated operation of the player is not need. So, familiarity of the game machine is not spoiled According to another aspect of the present invention, there is provided a game machine which comprises: a body comprising a play field and an operation part provided around the play field, the operation part comprising an operation member which outputs a signal in accordance with an operation of a player thereto; a first lottery practicing device for carrying out a first lottery process in which an indicating mark rotated along an outside of the play field is stopped on the basis of the signal from the operation member; a first payment controlling device which allows a payment of a reward with respect to the operation part when the indicating mark is stopped in a first prize area arranged so as to accord with a position of the operation part in a circumferential direction of the play field; a second lottery practicing device for carrying out a second lottery process on the play field when the indicating mark is stopped in a second prize area by carrying out the first lottery process, the second prize area including areas adjacent to both sides of the first prize area in the circumferential direction of the play field; an indicating device arranged so as to accord with the position of the operation part in the circumferential direction of the play field and indicating a situation of a lottery being carried out by the second lottery practicing device; and a second payment controlling device which gives an additional chance of paying the reward when a predetermined result is obtained in the second lottery process.

In the above invention, since the chance of the payment of the reward is also given by the second lottery process, an effect like one of the invention of claim 3 is gotten. With the mark which is rotated along the outside of the play field, the first lottery process is carried out. And if the indicating mark is stopped in the second prize area which is positioned in front of the operation part, the second lottery process is carried out later and the situation of the second lottery is indicated with the indicating device which is positioned right in front of the operation part. Therefore, the player can easily grasp a transfer from the first lottery process to the second lottery process intuitively, and can easily understand a contents of the game.

The indicating device may comprise a gage part which is extended from the operation part toward a center of the play field in a radial direction thereof. In this case, with the movement of the mark around the play field and the movement of the gage extended from the outer side of the play field toward the center thereof, an attractive effect of the game machine is improved.

In the present invention, as the bet value, currency may be used. And a medal, a prepaid card or the like, into which currency is changed, may be also used as the value. As the reward, currency may be paid. A medal or a gift may be also paid as the reward instead of currency. As the payment of the regard, an additional chance of a lottery may be given instead of paying the gifts or the like.

DETAILED DESCRIPTION OF THE PREFERRED EMBODIMENTS

Figure 1:
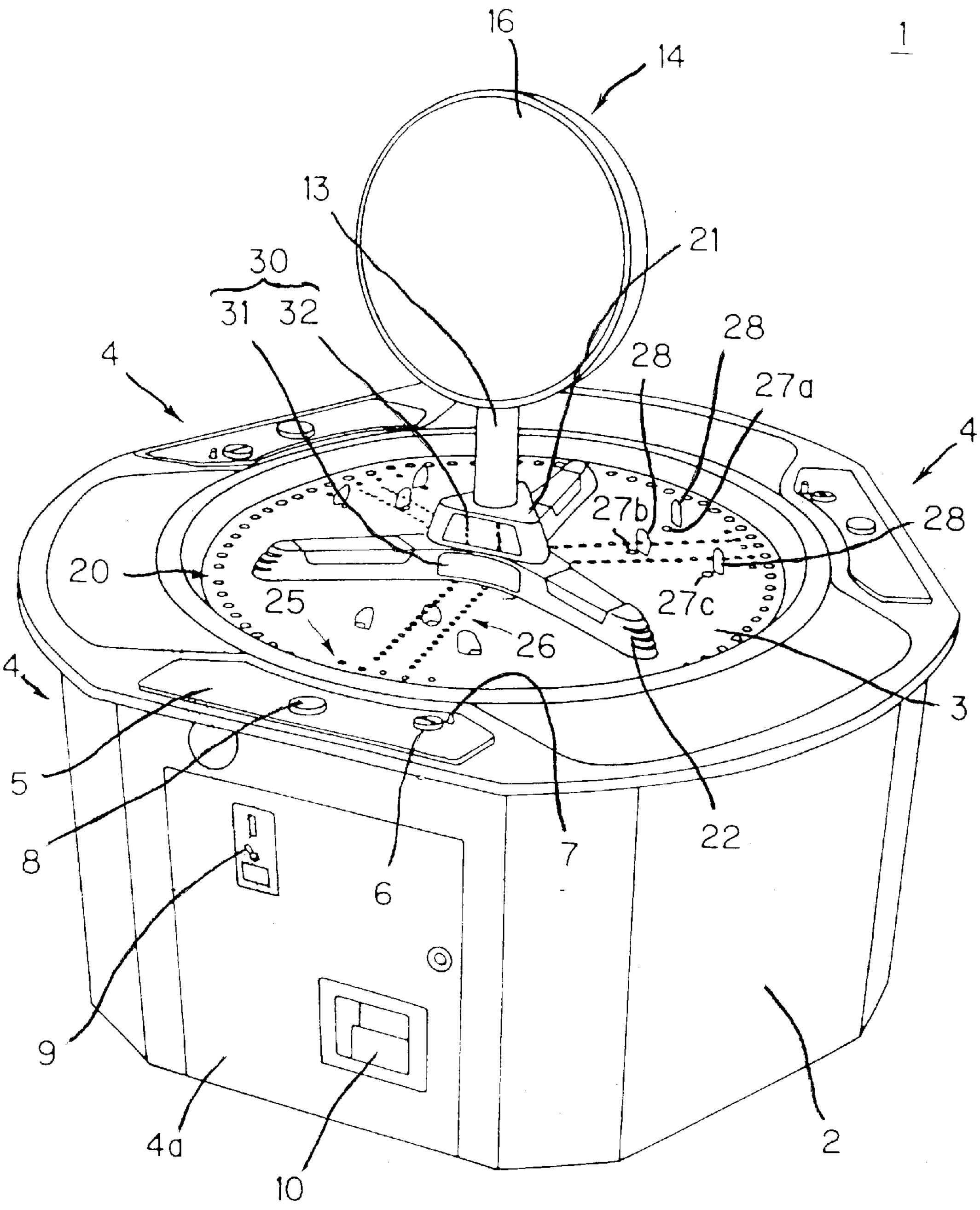
FIG. 1 is an perspective view showing an embodiment of a game machine to which the invention is applied.
Figure 2:
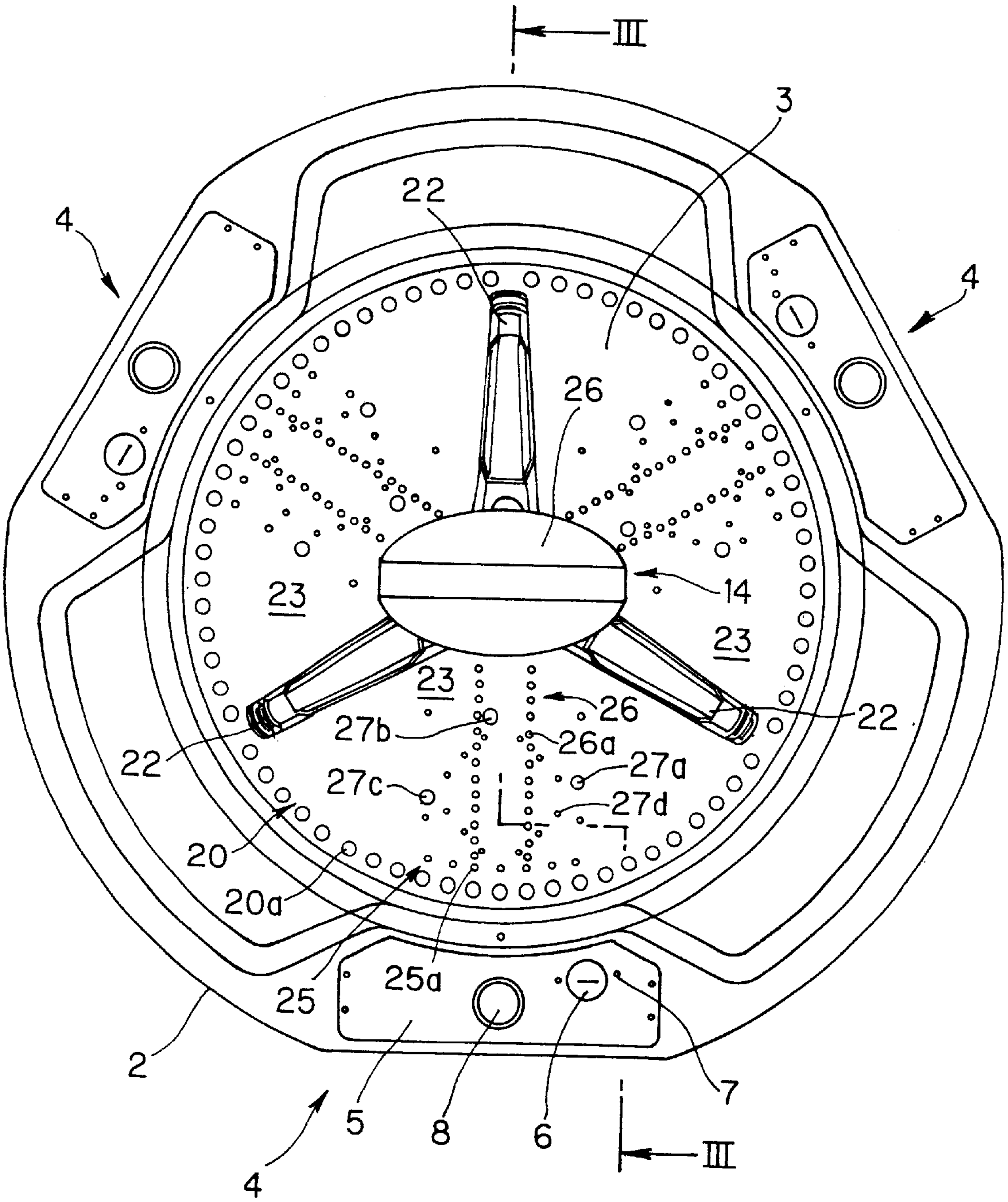
FIG. 2 is a plan view of the game machine illustrated in FIG. 1.
Figure 3:
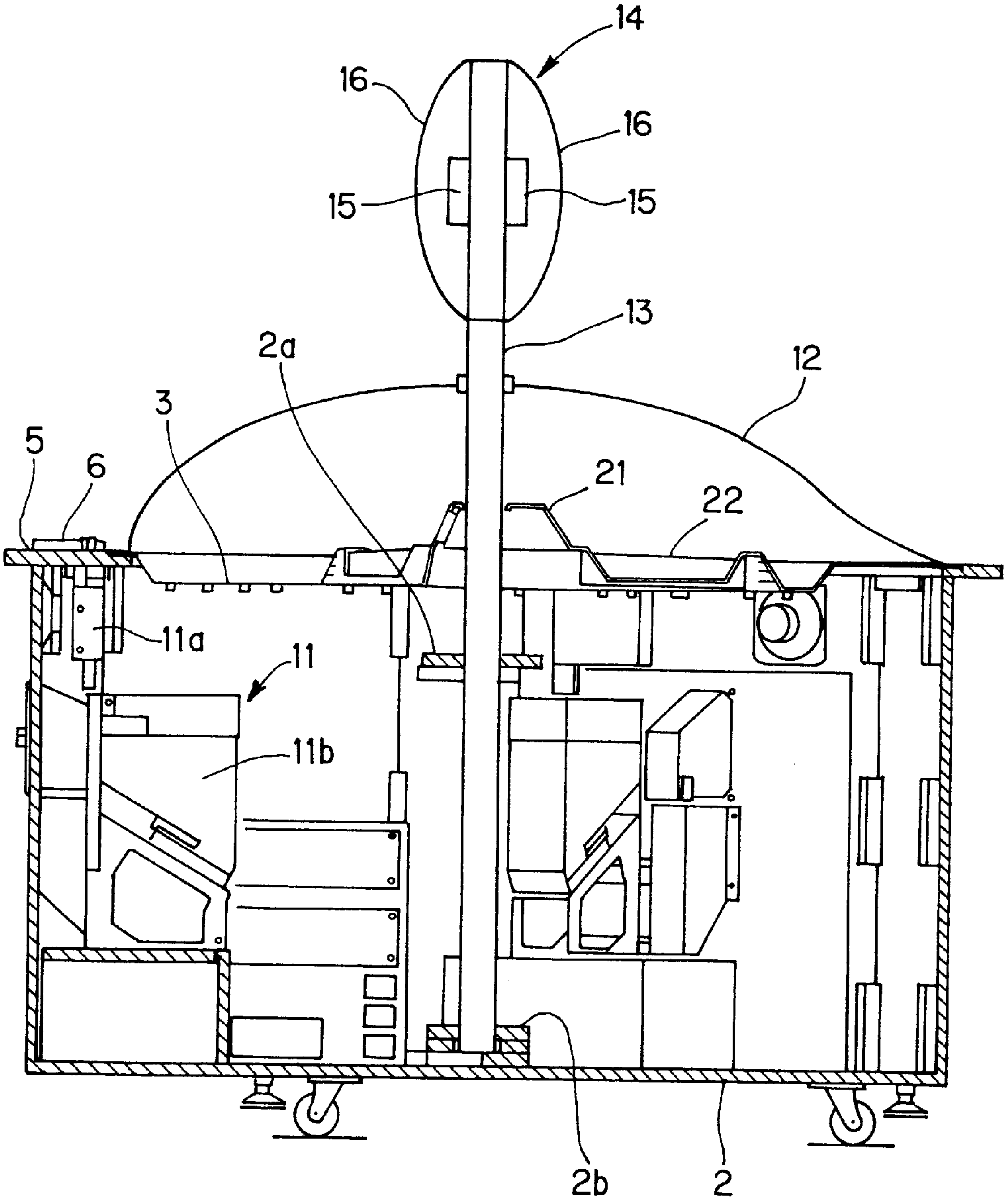
FIG. 3 is a sectional view taken along the line III—III in FIG. 2.

FIG. 1 shows an embodiment of a game machine to which the present invention is applied, FIG. 2 is a plan view of a game machine 1, and FIG. 3 is a vertical sectional view of the game machine taken along the line III—III of FIG. 2. As shown clearly in these figures, the game machine 1 is provided with a body 2 shaped like a cylinder. On the upper side of the body 2, a play field 3 is provided and three operation parts 4 . . . are positioned around the play field 3. Each operation part 4 is provided with a control panel 5, and the control panel 5 is provided with an inserting slot 6 through which medals are thrown, a button 7 which is operated for returning medals and a stop switch (operation member) 8. The stop switch 8 is composed with, for example, a push-button type switch, but other types of switch can be used as the stop switch 8.

On a front side of the operation part 4, a money changer 9 which issues predetermined pieces of medals when a predetermined sum of coins (metallic currencies) are thrown and a paying pocket 10 for paying the game medals are arranged. As shown clearly in FIG. 3, in the operation part 4 a medal managing apparatus 11 for receiving the medals thrown through the inserting slot 6, judging the truth or falsehood of them and paying them. The medal managing apparatus 11 is provided with a medal holding part 11*a* which is able to hold three medals maximum thrown through the inserting slot 6 and a medal storing part 11*b* in which the medals paid from the medal holding part 11*a* are stored. If the three medals are thrown and held in the medal holding part 11*a,* a passage through which the thrown medals pass is blocked up by a predetermined blocker and the throwing of an additional medal through the inserting slot 6 is prohibited. By operating the button 7, the medals held in the medal holding part 11*a* are returned to the paying pocket 10. The medals held in the medal holding part 11*a* are forwarded to the medal storing part 11*b* after a game is finished. Many medals can be held in the medal holding part 11*a,* and it picks medals of a predetermined pieces from the held medals and pays the picked medals for the paying pocket 10.

As shown in FIG. 3, the play field 3 is covered with a transparent cover 12 formed of acrylic resin. In a middle of the body 2, a pole 13 is disposed whose top part passes through the cover 12 and extends above the body 2. An electrical decoration 14 is positioned on the upper end of the pole 13. The electrical decoration 14 is provided with a lamp 15, such as a fluorescent light, and a globe 16 in the shape of an airtight container covering the lamp 15. The globe 16 is formed of milky-white acrylic resin or the like, and on its surface, a character or the like is drawn for decorating the game machine 1. Since the electric decoration 14 is away from the play field 3 via the pole 13 in the upper direction as stated above, view of the play field 3 from the operation parts 4 is not restricted by the electric decoration 14, and players are able to observe the play field 3 in every corner thereof The pole 13 is put into supporting parts 2*a,* 2*b* which are provided in the body 2 and is fixed with a fixing device (such as a bolt). Releasing the fixing of the pole 13, after opening a front door 4*a* (see FIG. 1) of the operation part 4, results in allowing the pole 13 to be pulled out and removed above the cover 12. Then a maintenance of the play field 3 becomes easy to be carried out by detaching the cover 12. Since the pole 13 is formed in the shape of a tube, it is possible to send air into the electric decoration 14 to cool it.

As shown clearly in FIG. 2, a roulette part 20 in which many lamps 20*a* . . . are arranged to form a ring-shape is positioned along an outer periphery of the play field 3. A projection 21 is disposed in the center of the play field 3, and three separate parts 22 . . . extend from the projection 21, to partition the play field 3 into three sections 23 ... corresponding to the operation parts 4, respectively.

Figure 4:
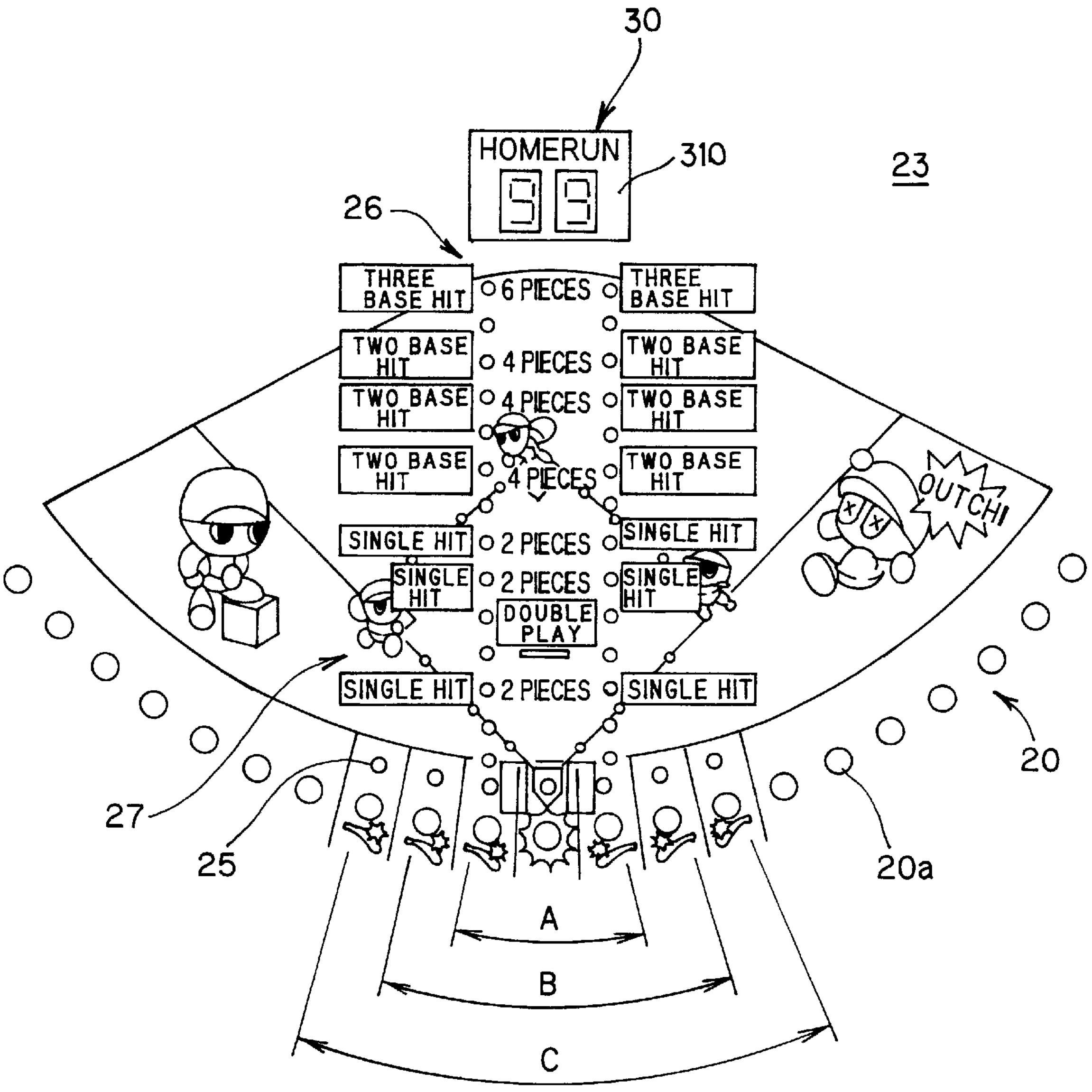
FIG. 4 is an expanded plan view showing one section of a play field of the game machine, with which an operation part thereof is associated.
Figure 5:
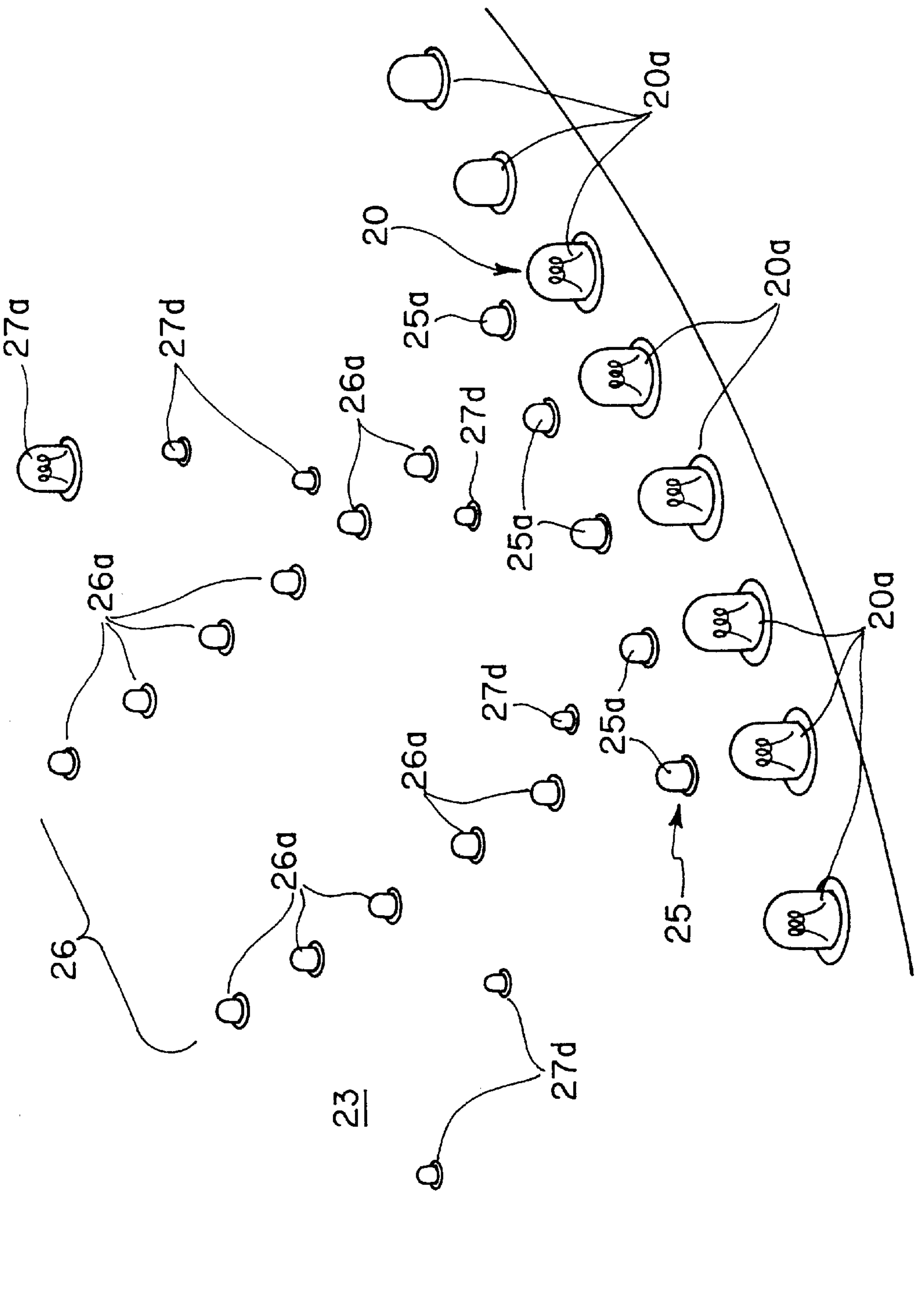
FIG. 5 is an enlarged view showing lamps positioned in the section shown in FIG. 4.

FIGS. 4 and 5 show the details of one of the sections 23. In the most outer area of the section 23, twenty one pieces of the above lamps 20*a* of the roulette part 20 are arranged. In an inner area of the roulette part 20, an illustration imitating a field of baseball is drawn and a chance gage 25, a level gage 26 and an advancing gage 27 are positioned, respectively. In each operation part 4 of the game machine 1, a game in which the image of baseball is called to mind is played by using the roulette part 20 and the gages 25–27.

The chance gage 25 is provided for informing a player of a prize area on the first lottery process carried out by using the roulette part 20, and is composed of seven pieces of LED 25*a* . . . arranged inside of the same number of lamps 20*a* which are positioned in the middle of an outer area of the play field 3. While the game is played, a lighting timing of each lamp 20*a* is controlled in such a manner that only one lamp 20*a* is turned on at every moment and the lighting position is moved in a clockwise direction rotation when viewed from a position over the play field 3. Then a movement of an indicating mark for a lottery which is rotated along the outside of the play field 3 is represented. If the game player pushes the stop switch 8 in this situation, the movement of the mark (light) is stopped in a position on the basis of the timing of this stopping operation. The player wins a prize if the mark is stopped at an area defined by the lighting LEDs 25*a,* while he fails if it is stopped out of the area.

The lighting area of the LEDs 25*a* (the prize area) is changed in accordance with the number of medals bet by the player for one chance of a lottery. When only medal is betted, a LED 25 positioned in the center of the chance gage 25 and the LEDs 25 which are located on both sides of the central LED 25 are turned on (these LEDs 25 total three). When two medals are bet, the central LED 25 and the couples of LEDs 25 located on the both sides of the central LED 25 are turned on (these LEDs 25 total five). When three pieces of medals are betted, all LEDs 25 (seven LEDs 25) are turned on. If the mark is stopped at the position of the central LED 25*a,* the medals are immediately paid as a "home run", but if the mark is stopped at a position of any other six LEDs 25*a,* a lottery with a level gage 26 is started. If the mark is stopped out of the prize area, the lottery with the chance gage 25 ends in failure. In this embodiment, the center of the chance gage 25 corresponds to a first prize area and the other area of the chance gage 25 corresponds to a second prize area, respectively. And the lottery with the level gage 26 corresponds to a second lottery process. However the center of the chance gage 25 may be included in the second prize area. The second prize area may be separated from the first prize area.

The level gage 26 is provided with a large number of LEDs 26*a* . . . arranged from the center of the roulette part 20 of each section 23 toward the center of the play field 3 so as to make two parallel lines, and a gage volume is indicated by a position of a lighting LED 26*a* or the number of lighting LEDs 26*a.* This level gage 26 functions as a gage part of an indicating device which shows a situation of the second lottery process. If the mark of roulette 20 is stopped in a lighting area of the gage 25 except the center thereof, the lighting of each LED 26 is controlled such that the gage level is increased from a side of a home base (a near side of the player) to the center of the play field 3. After that, the gage is stopped at a random position.

If the level gage 26 is stopped in any success position on which the word "single hit", "two base hit" or "three base hit" is noted, the medals whose number is noted on the position in which the level gage 26 is stopped, are paid. For example, if the gage 26 is stopped in the "single hit", two medals are paid. And if the gage is stopped in any success position, this is regarded that a runner advances to the base corresponding to the position at which the gage is stopped and an indication of the advancing gage 27 is changed.

The advancing gage 27 is provided with three lamps 27*a,* 27*b* and 27*c* which are located at positions of first base, second base and third base of the baseball field on the play field3, respectively, and plural LEDs 27*d* . . . arranged between the adjacent bases. The lamps 27*a*–27*c* are provided for indicating whether a runner gets to first to third base, respectively. The LEDs 27*d* represent, for example, an advancing of a runner with being turned on one after another in a direction from home base to first base.

If the level gage 26 is stopped in any success positions, a runner advances in accordance with a hit number (1, 2 or 3). The situation of advancing is continuously used in the next game, and whenever the level gage 26 is stopped in any success positions, the position of the runner is changed according to the situation of advancing until then. For instance, if the level gage 26 is stopped in the "single hit" position when the runner is positioned on first base (when the lamp 27*a* is turned on), the runner advances to second base and a new runner is added on first base. When the runner reaches home base by repeating an advancing, the medals corresponding thereto are paid to the player as a bonus. When the "home run" is hit with the lottery of the roulette part 20 (in this time, a lighting position is stopped in the center of the prize area), a predetermined number of medals are paid to the player. This number is obtained by adding a number of medals to be paid corresponding to the "home run" and a number of medals to be paid corresponding to the number of runners. If the level gage 26 is stopped in the position on which the word "double play" is noted, one runner being on any base at the time is eliminated.

As shown clearly in FIG. 1, plates 28 . . . are attached close to the lamps 27*a* on the bases, and illustrations or the like simulating runners are drawn on these plates 28. On the projection 21, a display unit 30 is attached for performing, for example, an indication when the "home run" is hit. The display unit 30 is provided with a medal counter 31 (see FIG. 4) for indicating the number of medals paid when the "home run" is hit and a lot of LEDs 32 . . . arranged so as to extend the level gage 26.

Figure 6:
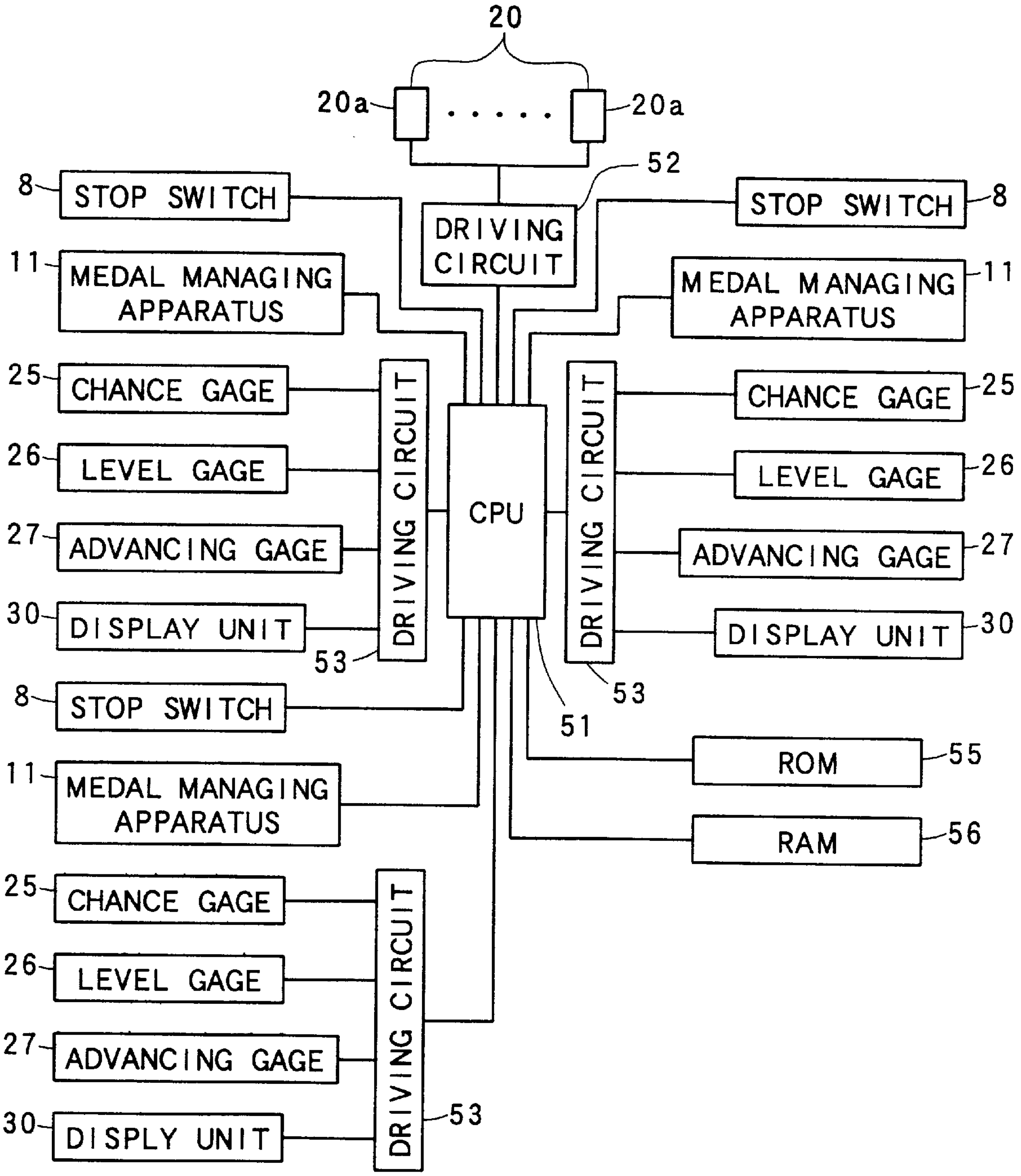
FIG. 6 is a block diagram of a control system provided for the game machine illustrated in FIG. 1.

FIG. 6 is a block diagram to show a structure of a control system of the game machine 1. The game machine 1 is provided with a CPU 51 which includes a microprocessor as a main part thereof. The above lamps 20*a* . . . of the roulette part 20 are connected to the CPU 51 through a predetermined driving circuit 52. The chance gage 25, the level gage 26, the advancing gage 27 and the display unit 30 of each section 23 are connected to the CPU 51 through a driving circuit 53.

The stop switch 8 and the medal managing apparatus 11 of each operation part 4 are connected to the CPU 51. The stop switch 8 outputs a stopping signal corresponding to a depressing thereto. The medal managing apparatus 11 detects a medal thrown to the medal holding part 11*a* via the medal inserting slot 6 and then outputs a medal-receiving signal into the CPU 51. The stopping switch 8 and the medal managing apparatus 11 are managed by using particular numbers corresponding to each operation parts 4, to make a relationship between each operation part 4 and each section 23 clear.

Further, a ROM 55 in which programs and data necessary for carrying out the game are stored and a RAM 56 in which data or the like are temporarily memorized are connected to the CPU 51, respectively. In the RAM 56, data for specifing a prize area of the roulette part 20, a situation of advancing or the like is memorized. When a predetermined initializing operation, such as an operation to turn on a power supply or an operation to a reset switch (not shown in the figures) is performed, the CPU 51 starts a control operation necessary for carrying out the game on the basis of the programs and the data stored in the ROM 55. The process of the control will be explained below. The later explanation refers to one of the operation parts 4 and a section 23 corresponding thereto, however, relations between the other operation parts 4 and the respective corresponding sections 23 are the same with the one which will be explained.

Figure 7:
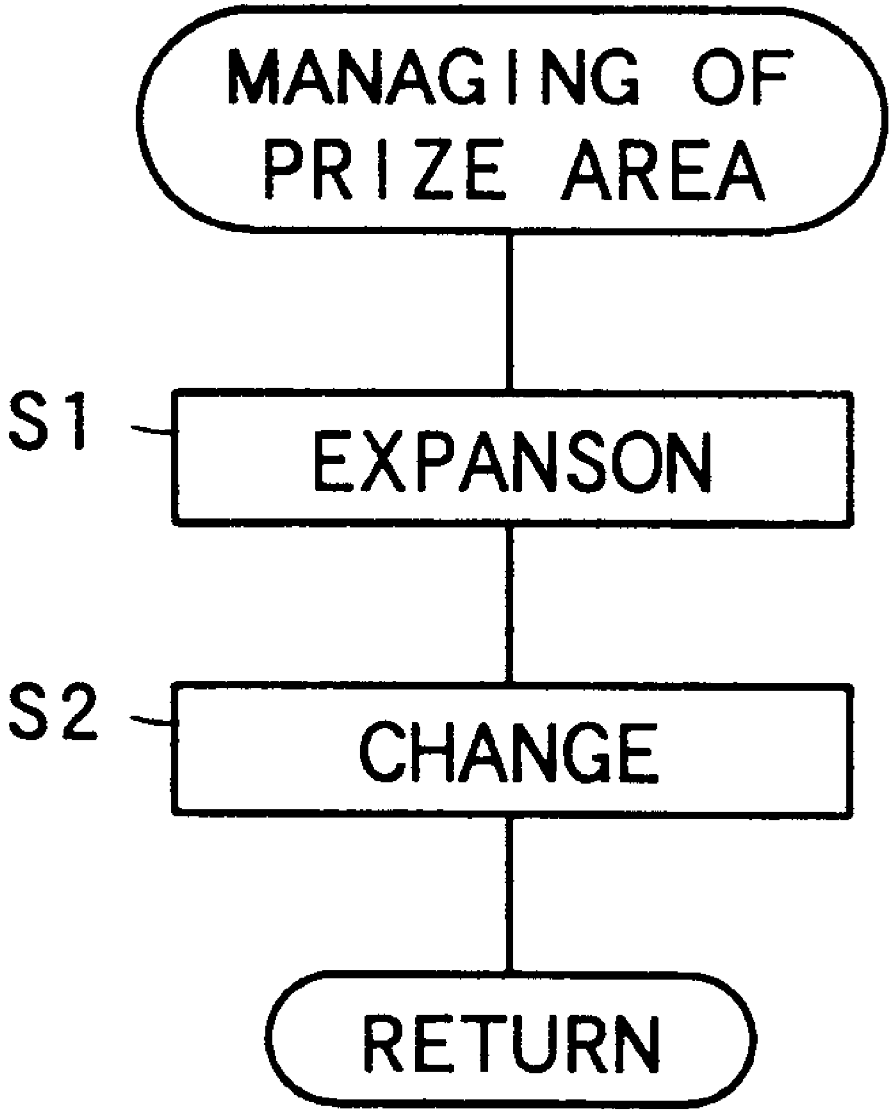
FIG. 7 is a flow chart showing a process for managing a prize area performed by a CPU shown in FIG. 6.

When the medal is thrown into the medal holding part 11*a* (see FIG. 3) of the medal managing apparatus 11, the signal informing of the throwing of the medal is outputted from the medal managing apparatus 11 and the signal is received by the CPU 51. Then the CPU 51 carries out a process shown in FIG. 7 by interrupting.

In this process, data stored in the RAM 56, for identifying the prize area is renewed so that the prize area is expanded (step S1). Then, a state of lighting of the chance gage 25 is changed with the renewal of the prize area. And again, the CPU 51 returns to carry out the process which was carried out before the interrupting. The relation between the number of the medals and the prize area is shown in FIG. 4. A device for determining a prize area is realized through the above process.

Figure 8:
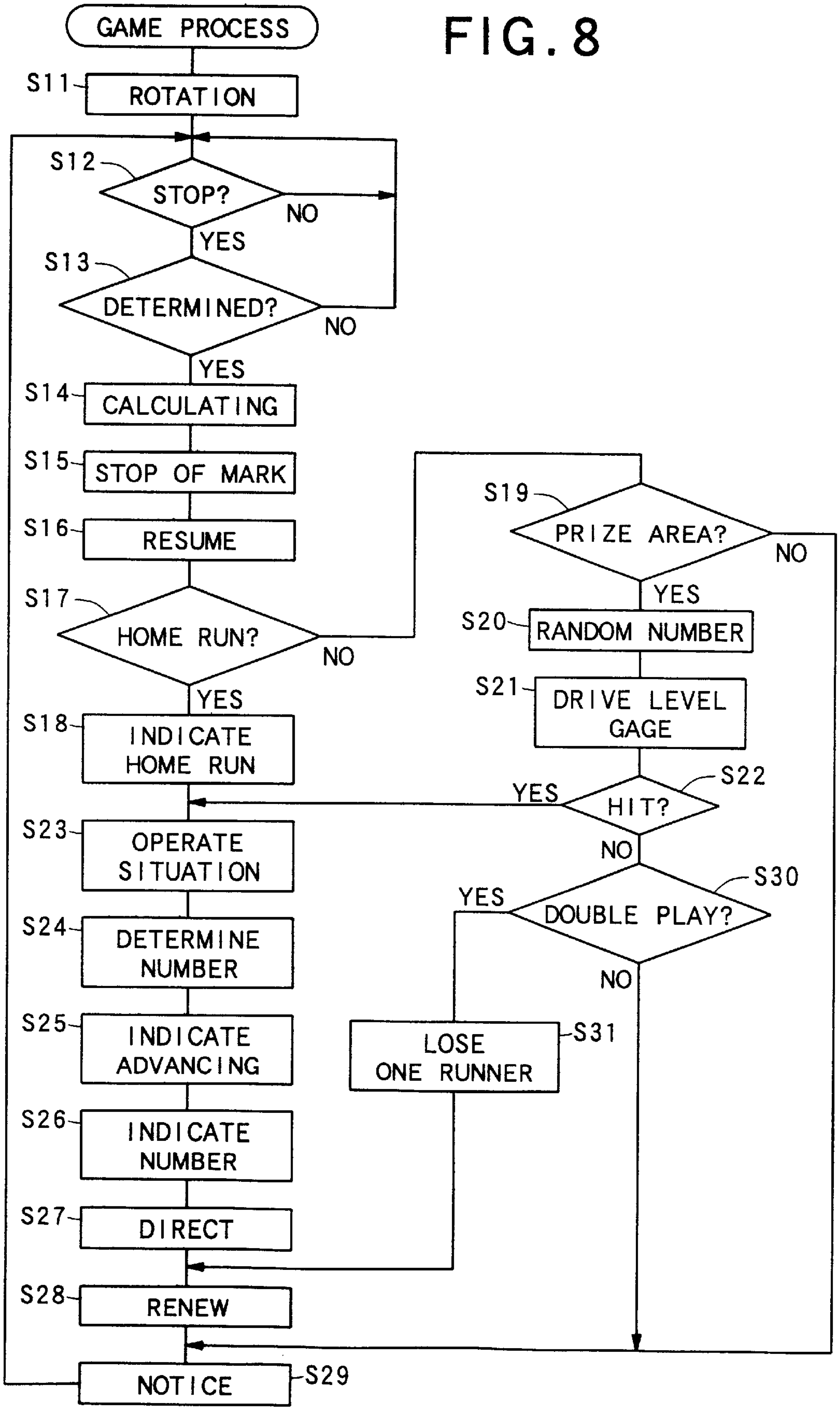
FIG. 8 is a flow chart showing a process for carrying out a game performed by the CPU.

FIG. 8 shows the way of a game in which the roulette part 20 and the level gage 26 are used. First of all, in this process a rotation of the lighting mark is started (step S11), and it is judged whether or not a signal which indicates a stopping operation has been outputted from the stop switch 8 (step S12). If the stopping operation has been carried out, it is judged whether or not the prize area in the section 23 corresponding to the operation part 4 to which the stopping operation is carried out has been determined, that is, whether or not the player has bet some medals (step S13), and then if the prize area is not determined yet, the stopping operation is neglected and the judgement of the step S12 is repeated. The judgement as to whether or not the medals is bet can be carried out on the basis of the data of the prize area, which is managed by the process of FIG. 7.

If some medals has been already bet before the stopping operation is carried out, the stopping position of the mark of the roulette part 20 is calculated (step S14) in accordance with a timing of the stopping operation, and the mark is stopped a while on the basis of a result of the calculating (step 15). A length of a moving trace of the mark, which is drawn for a period from the time that the stopping operation is carried out to the time that the mark is actually stopped may be fixed, however the length of the trace may be varied irregularly by using random numbers.

After the mark is stopped a while, the mark is again rotated (step S16), and then it is judged whether or not the "home run" is hit, that is, whether or not the stopping position of the mark coincides the center of the prize area (step S17). If the "home run" is hit, an indicating for expressing the "home run" is carried out with the level gage 26 and the display unit 30 (step S18). For example, the LEDs 26*a* of the level gage 26 are turned on one after the other towards the display unit 30, and after the lighting part of the level gage 26 being lengthened to its limit, the LEDs 32 of the display unit 30 are turned out one after the other such that a lighting part is lengthened from a lower side of the display unit 30 to an upper side thereof, to express the "home run". After that the process proceeds to a step S23.

The CPU 51 judges whether the mark is stopped in the prize area (step S19), if it is concluded that no home run is hit by the judgement of the step S17. The prize area at this time is changed according to the number of medals.

If a result of the judgement in the step S19 is negative, the process of a step S29 is carried out, and if this result is positive, a random number is generated for a lottery with the level gage 26 (step S20). Then the level gage 26 is driven and it is stopped in a position corresponding to the generated random number (step S21). And it is judged whether the gage 26 is stopped in a prize position (step S22). Then if the gage 26 is stopped in the prize position, the process of the step S23 is carried out.

In the step S23, the number of runners who have come back alive and a situation of an advancing to be renewed are operated on the basis of data related to a present situation of an advancing and a result of the new game. When a new runner is generated in this stage, a privilege of getting a reward at a future chance of a lottery is given to the player. And the number of medals to be paid is determined (step S24). This number is the total of the number of medals corresponding to the "home run" or the "hit" and the number of medals corresponding to a getting home of the runner who has already gotten to any base.

After that the runner who is advancing by the "home run" or the "hit" is expressed by the advancing gage 27 (step S25) by referring to the situation of advancing which has been operated by the step S23, and so, the lamps 27*a*–27*c* corresponding to the bases to which the runners come to get are turned on. Then the number of the paid medals determined in the step S24 is displayed with the counter 31 of the display unit 30 (step 26), and the medal managing device 11 is directed to pay the displayed number of medals (step 27). In response to this direction, the medals, the number of which is directed, is paid through the medal storing part 11*b* of the medal managing device 11 to the paying pocket 10. After that, the data of a situation of an advancing is renewed (step S28) and the medal managing device 11 receives a notice that a game is finished (step S29), and then the process of the step S12 is carried out. In the medal managing device 11, the medals held in the medal holding part 11*a* are paid to the medal storing part 11*b* with the notice of the game finish, and then the medals are ready to be received for the next game.

If the it is judged that the gage 26 has been stopped out of the prize area at the step S22, the CPU 51 judges whether or not the level gage 26 is stopped in a position of "double plays" (step S30) and if it is not stopped in the position of "double play", the process of a step S29 is carried out. On the other hand, if it is stopped in the position of "double play", a display of the advancing gage 27 is changed so as to lose one advancing runner and then the process of the step S28 is carried out. In this case, the data of advancing is renewed so as to lose one runner by the step S28.

In the above embodiment, the lottery practicing device and the first lottery practicing device are embodied by the roulette part 20 and the process of the steps S11–S15, the first payment controlling device is embodied by the process of the steps S17, S23, S24 and S27, the second lottery practicing device is embodied by the process of the steps S19 and S20, the second payment controlling device is embodied by the process of the steps S22–24 and S27, the privilege extinguishing device is embodied by the process of the steps S30 and S31, the random number generating device is embodied by the process of the step S20.

The present invention is applied not only to the above embodiment but also to a variety of other game machines. For example, the roulette part 20 expresses the rotation of the mark by controlling the lighting of lamps 20*a,* but a mark formed of a material body may be moved instead. A time of stopping the level gage 26 may be determined according to directing of a player. When the level gage 26 is stopped in the "hit" position, the payment of the medals and the advancing of the runner are both carried out as stated above, but either of them may be omitted. The second process of the lottery is not limited to the game like baseball, but a game like such as soccer, American football or rugby is applied to the process. In this case, a structure may be adopted, in which a situation of a ball moves in a front or rear direction is expressed on the play field and the medals are paid if the ball is brought to a goal. A board game may be carried out, such as "sugoroku" in which a piece is moved in accordance with a result of the second process of the lottery. The way of the movement of the mark in the first process of the lottery is not limited to the above one, but the mark may be moved in various directions, for example, it may be moved in a straight line on the play field. The shape of the level gage 26 is not limited to the straight line, but it may express a movement of a lighting going around the play field 3 or going around the section 23.

As explained above, in the present invention, a simple playing form is adopted, in which an indicating mark is stopped in accordance with a directing of a player and a result of a lottery is decided on the basis of a position of the stopped mark. But because of changing a prize area according to a amount of a value which is thrown by a player per a chance of a lottery, and generating a prize result which is changed in accordance with a position of the stopped mark, a monotony is banished from a game and the player is able to be attracted for a long time.

And two kinds of prize areas or a first prize area and a second prize area are positioned in a route of an indicating mark, and a reward is paid at once if the indicating mark is stopped in the first prize area, on the other hand an additional chance is given of paying a reward via a second lottery process if the indicating mark is stopped in the second prize area. Therefore a monotony is banished from a game and a hope of a player for a payment of a reward is specially raised as compared with an usual game machine.

When the mark is rotated along the outside of the body of the game machine and the first prize area and the second prize area are positioned in right front of the operation part which is attached on the outside of the body, and further, the indicating device for indicating the situation of the second lottery process is positioned on the inside of these prize areas, the player can easily notice the transfer from the first lottery process to the second lottery process intuitively and the game is prevented from being complicated effectively. Specially when the indicating device is formed in the shape of the gage along the diameter of a play field such that the indicating device extends from the operation part toward the center of the play field.

What is claimed is:

1. A game machine, comprising:

a lottery practicing device for carrying out a process of a lottery in which an indicating mark is advanceably locatable at various positions along a predetermined route and can be paused at a given one of said various positions in accordance with a direction of a player;

a prize area arranging device for arranging a prize area along the route, a size of the prize area being changed in accordance with value which is bet by the player per one chance of the lottery; and a lottery result deciding device for issuing a lottery result when the indicating mark is paused in the prize area, said lottery result being decided independent of a position of another indicating mark relative said indicating mark, the lottery result being changed in accordance with a position occupied by the indicating mark when paused.

2. A game machine according to claim 1, wherein the prize area arranging device expands the prize area with increasing the bet value.

3. A game machine, comprising:

a first lottery practicing device for carrying out a first lottery process in which an indicating mark is advanceably locatable at various positions along a predetermined route and can be paused at a given one of said various positions in accordance with a direction of a player;

a first prize area set in a part of the route;

a first payment controlling device for allowing a payment of a reward to the player when the indicating mark is paused in said first prize area;

a second prize area in the route;

a second lottery practicing device for carrying out a second lottery process when the indicating mark is paused in said second prize area by the first lottery process; and a second payment controlling device for giving an additional chance for the payment of the reward when a predetermined result is obtained by the second lottery process, the payment of the reward being made independent of a position of another indicating mark relative said indicating mark.

4. A game machine according to claim 3, wherein the second payment controlling device allows the payment of the reward to the player when a result of the second lottery process satisfies a predetermined payment condition.

5. A game machine according to claim 3, wherein when a result of the second lottery process satisfies a predetermined entitling condition, the second payment controlling device entitles a privilege by which the player can get the reward with a combination of the result of the present second lottery process and a future result of one of the first and the second lottery process.

6. A game machine according to claim 5, wherein the first payment controlling device allows the payment of the reward based on the privilege in addition to the payment of the reward corresponding to the first lottery process, if the privilege of getting the reward based on a previous second lottery process remains when the indicating mark is paused in the first prize area positioned in the part of the route.

7. A game machine according to claim 5, wherein when the privilege of getting the reward is entitled by the second lottery process, the second payment controlling device allows the payment of the reward if a combination of the privilege and a privilege of getting the reward corresponding to a previous second lottery process satisfies a predetermined payment condition.

8. A game machine according to claim 5 which comprises a privilege extinguishing device for extinguishing the privilege of getting the reward which is given by a previous second lottery process if the result of the second lottery process satisfies a predetermined extinguishing condition.

9. A game machine according to claim 3, wherein the second prize area includes an area part outside of the first prize area.

10. A game machine according to claim 9, wherein the second lottery practicing device comprises a random number generating device for generating a random number, and the second payment controlling device judges whether or not the additional chance should be given on the basis of the random number generated by the random number generating device.

11. A game machine according to claim 3 wherein, the second prize area includes an area part adjacent to the first prize area in a direction of advancing location of the indicating mark.

12. A game machine according to claim 11, further comprising a prize area arranging device for one of expanding and reducing one of the first prize area and the second prize area along the route in accordance with an amount of the value which is bet by the player per said one chance of the lottery.

13. A game machine according to claim 12, wherein the prize area arranging device one of expands and reduces the second prize area.

14. A game machine according to claim 12, wherein the prize area arranging device arranges at least the first prize area in the route when a predetermined minimum value per said one chance of the lottery is bet by the player, and arranges a second prize area in such a manner that a size thereof corresponds to a surplus of the bet value over the minimum value when the bet value is greater than the minimum value.

15. A game machine according to claim 14, wherein the indicating device comprises a gage part which is extended from the operation part toward a center of the play field in a radial direction thereof.

16. A game machine according to claim 11, wherein the second lottery practicing device comprises a random number generating device for generating a random number, and the second payment controlling device judges whether or not the additional chance should be given on the basis of the random number generated by the random number generating device.

17. A game machine according to claim 3, further comprising a prize area arranging device for one of expanding and reducing one of the first prize area and the second prize area along the route in accordance with an amount of the value which is bet by the player per said one chance of the lottery.

18. A game machine according to claim 17, wherein the prize area arranging device one of expands and reduces the second prize area.

19. A game machine according to claim 17, wherein the prize area arranging device arranges at least the first prize area in the route when a predetermined minimum value per said one chance of the lottery is bet by the player, and arranges a second prize area in such a manner that a size thereof corresponds to a surplus of the bet value over the minimum value when the bet value is greater than the minimum value.

20. A game machine according to claim 17, wherein the second lottery practicing device comprises a random number generating device for generating a random number, and the second payment controlling device judges whether or not the additional chance should be given on the basis of the random number generated by the random number generating device.

21. A game machine according to claim 17, wherein the second lottery practicing device comprises a random number generating device for generating a random number, and the second payment controlling device judges whether or not the additional chance should be given on the basis of the random number generated by the random number generating device.

22. A game machine according to claim 3, wherein the second lottery practicing device comprises a random number generating device for generating a random number, and the second payment controlling device judges whether or not the additional chance should be given on the basis of the random number generated by the random number generating device.

23. A game machine, comprising:

a body comprising a play field and an operation part provided around the play field, the operation part comprising an operation member which outputs a signal in accordance with an operation of a player thereto;

a first lottery practicing device for carrying out a first lottery process in which an indicating mark is advanceably locatable at various positions along an outside of the play field and can be paused at a given one of said various positions on the basis of the signal from the operation member;

a first payment controlling device which allows a payment of a reward with respect to the operation part when the indicating mark is paused in a first prize area arranged so as to accord with a position of the operation part in a circumferential direction of the play field;

a second lottery practicing device for carrying out a second lottery process on the play field when the indicating mark is paused in a second prize area by carrying out the first lottery process, the second prize area including areas adjacent to both sides of the first prize area in the circumferential direction of the play field;

an indicating device arranged so as to accord with the position of the operation part in the circumferential direction of the play field and indicating a situation of a lottery being carried out by the second lottery practicing device; and a second payment controlling device which gives an additional chance of paying the reward when a predetermined result is obtained in the second lottery process the reward being paid independent of a position of another indicating mark relative said indicating mark.

* * * * *